(12) United States Patent
Penninger et al.

(10) Patent No.: US 9,868,427 B2
(45) Date of Patent: Jan. 16, 2018

(54) VEHICLE HYDRAULIC BRAKE BOOSTER SYSTEM AND METHOD

(71) Applicant: Robert Bosch GmbH, Stuttgart (DE)

(72) Inventors: William John Penninger, Niles, MI (US); Richard Becker McClain, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/227,399

(22) Filed: Aug. 3, 2016

(65) Prior Publication Data

US 2017/0106845 A1 Apr. 20, 2017

Related U.S. Application Data

(60) Provisional application No. 62/241,577, filed on Oct. 14, 2015.

(51) Int. Cl.
| | |
|---|---|
| *B60T 17/16* | (2006.01) |
| *B60T 13/14* | (2006.01) |
| *B60T 8/40* | (2006.01) |
| *B60T 13/16* | (2006.01) |
| *B60T 13/18* | (2006.01) |
| *B60T 13/68* | (2006.01) |
| *B60T 8/32* | (2006.01) |

(52) U.S. Cl.
CPC ............ *B60T 13/148* (2013.01); *B60T 8/40* (2013.01); *B60T 13/143* (2013.01); *B60T 13/168* (2013.01); *B60T 13/18* (2013.01); *B60T 17/16* (2013.01); *B60T 8/328* (2013.01); *B60T 13/686* (2013.01)

(58) Field of Classification Search
CPC .......... B60T 13/14; B60T 13/16; B60T 17/16; B60T 17/122; B60T 8/40; B60W 10/06; B60W 10/18; B60W 10/182; B60W 10/184; B60W 10/188; B60W 30/18109; B60W 30/18118
See application file for complete search history.

(56) References Cited

U.S. PATENT DOCUMENTS

| | | |
|---|---|---|
| 3,633,363 A | 1/1972 | Larsen |
| 3,675,422 A | 7/1972 | Drutchas et al. |
| 3,831,491 A | 8/1974 | Thomas |
| 3,898,809 A | 8/1975 | Baker |
| 3,945,301 A | 3/1976 | Buente et al. |

(Continued)

*Primary Examiner* — Nicholas J Lane
(74) *Attorney, Agent, or Firm* — Michael Best & Friedrich LLP

(57) ABSTRACT

A vehicle brake booster system includes a reservoir, a pump, and a brake booster. The brake booster includes an input member adapted to receive a manual braking input force and an output member adapted to apply a braking output force to a master cylinder. A supply line couples the pump to the brake booster, and a return line couples an outlet of the brake booster to the reservoir. A flow of hydraulic fluid pumped to the brake booster provides a boost factor by which the braking output force exceeds the braking input force. The brake booster is hydraulically lockable by a first valve in the supply line and a second valve in the return line such that when the first and second valves are closed, a quantity of hydraulic fluid is trapped within the brake booster to maintain operation of the brake booster without continued operation of the pump.

13 Claims, 3 Drawing Sheets

(56) References Cited

U.S. PATENT DOCUMENTS

| | | | |
|---|---|---|---|
| 3,995,529 A | 12/1976 | Bach et al. | |
| 4,075,848 A | 2/1978 | Ueda | |
| 4,139,988 A * | 2/1979 | Adachi | B60T 13/168 60/547.1 |
| 4,149,379 A | 4/1979 | Shimizu | |
| 4,154,059 A | 5/1979 | Bach et al. | |
| 4,161,867 A | 7/1979 | Adachi | |
| 4,202,248 A * | 5/1980 | Ewald | B62D 5/083 137/625.23 |
| 4,208,950 A * | 6/1980 | Baynes | B60T 13/163 60/548 |
| 4,217,758 A | 8/1980 | Bach et al. | |
| 4,283,994 A | 8/1981 | Belart | |
| 4,319,455 A * | 3/1982 | Schubert | B60T 13/144 60/547.2 |
| 4,475,336 A | 10/1984 | Runkle | |
| 4,743,071 A * | 5/1988 | Iwamoto | B60T 11/105 188/353 |
| 4,835,967 A | 6/1989 | Nomura | |
| 4,967,560 A * | 11/1990 | Konishi | B60T 7/122 60/541 |
| 4,976,105 A | 12/1990 | Horiuchi et al. | |
| 5,066,077 A * | 11/1991 | Farr | B60T 7/122 188/DIG. 2 |
| 5,505,276 A | 4/1996 | Luibrand | |
| 5,549,361 A * | 8/1996 | Sorensen | B60T 13/168 137/100 |
| 6,258,008 B1 * | 7/2001 | Tabata | B60K 6/365 477/107 |
| 2006/0123776 A1 * | 6/2006 | Viswanathan | B60T 13/145 60/413 |
| 2008/0067865 A1 * | 3/2008 | Wong | B60T 13/165 303/113.5 |

* cited by examiner

VEHICLE HYDRAULIC BRAKE BOOSTER SYSTEM AND METHOD

CROSS-REFERENCE TO RELATED APPLICATIONS

This application claims priority to U.S. Provisional Patent Application No. 62/241,577, filed Oct. 14, 2015, the entire contents of which are hereby incorporated by reference.

BACKGROUND

The present invention relates to vehicles and vehicle braking systems. More particularly, the invention relates to hydraulic brake boosters.

SUMMARY

In one aspect, the invention provides a vehicle brake booster system including a reservoir, a pump operable to drive a hydraulic fluid from the reservoir, and a brake booster. The brake booster includes an input member adapted to receive a manual braking input force from a vehicle operator and an output member adapted to apply a braking output force to a master cylinder. A supply line couples an outlet of the pump to an inlet of the brake booster, and a return line couples an outlet of the brake booster to the reservoir. A flow of hydraulic fluid pumped to the brake booster by the pump provides a boost factor by which the braking output force exceeds the braking input force. The brake booster is hydraulically lockable by a first valve in the supply line and a second valve in the return line such that when the first and second valves are closed, a quantity of hydraulic fluid is trapped within the brake booster to maintain operation of the brake booster without continued operation of the pump.

In another aspect, the invention provides a method of operating a vehicle. A pump is driven with an engine, the pump supplying hydraulic fluid to a brake booster. The engine is shut down with a control signal of a preprogrammed stop/start routine. The brake booster is locked to prevent outflow of the hydraulic fluid from the brake booster.

In another aspect, the invention provides a vehicle including a plurality of drive wheels and an engine for powering the drive wheels to move the vehicle along the ground. The vehicle includes a brake booster system including a reservoir, a pump operable to drive a flow of hydraulic fluid from the reservoir, and a brake booster. A supply line couples an outlet of the pump to an inlet of the brake booster, and a return line couples an outlet of the brake booster to the reservoir. The brake booster includes an input member adapted to receive a manual braking input force from a vehicle operator and an output member adapted to apply a braking output force to a master cylinder. A flow of hydraulic fluid pumped to the brake booster provides a boost factor by which the braking output force exceeds the braking input force. The brake booster is hydraulically lockable by a first valve in the supply line and a second valve in the return line such that when the first and second valves are closed, a quantity of hydraulic fluid is trapped within the brake booster to maintain operation of the brake booster without continued operation of the pump.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
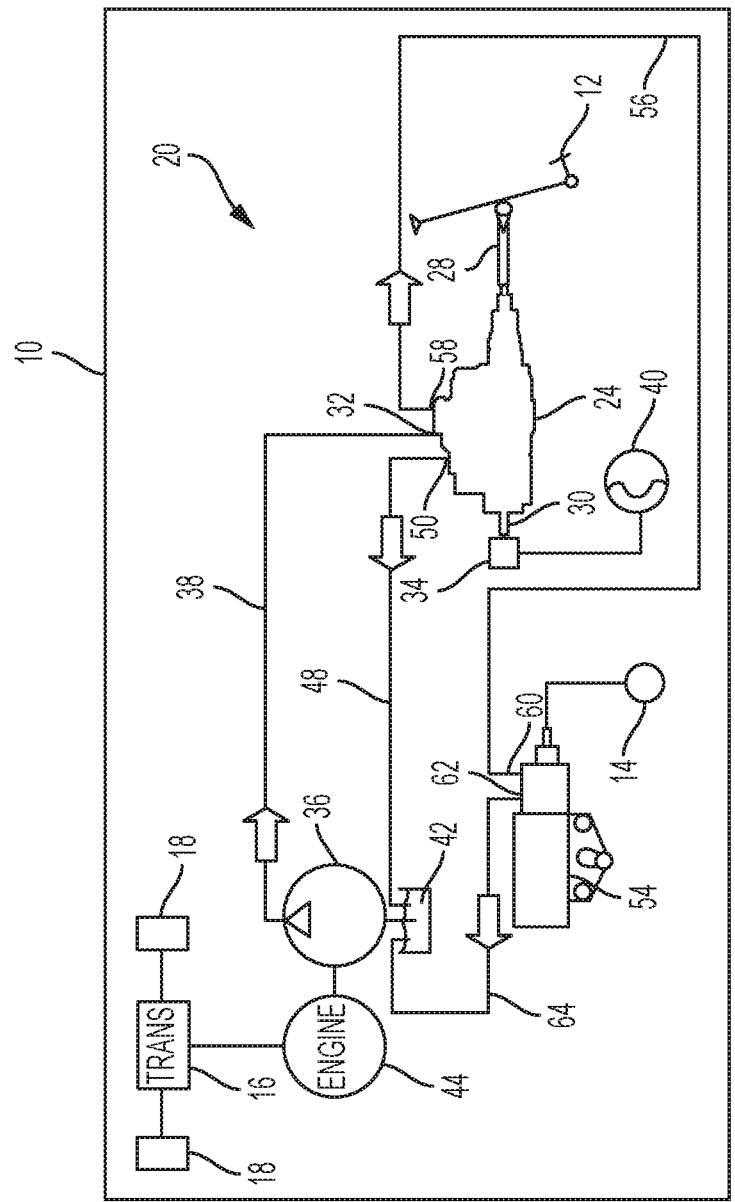
FIG. 1 schematically illustrates a vehicle including a hydraulic vehicle brake booster system.

FIG. 1 illustrates a vehicle 10 including an engine 44 (e.g., internal combustion engine) for powering the drive wheels 18 via a transmission 16 to move the vehicle 10 along the ground. The vehicle 10 further includes a hydraulic brake booster system 20, for example, an open center hydraulic brake circuit where a continuous flow of hydraulic oil is supplied during normal operation. The booster system 20 includes a booster 24 having an input member 28 configured to receive a braking input force (e.g., from a brake pedal 12) that is boosted by the booster 24. The input force and the additional boost force are conveyed to an output member 30 which may be coupled to the input of a master cylinder 34 for actuating one or more hydraulic brake devices 40 of the vehicle 10. Although not shown in the schematic diagram, the hydraulic brake device(s) 40 can be positioned at the drive wheels 18 and/or at one or more non-driven wheels. The hydraulic brake device 40 is associated with one of the vehicle wheels 18 to provide vehicle braking. The booster 24 includes an inlet 32 to receive a flow of pressurized hydraulic fluid from a pump 36 via a supply line 38 in order to provide boosting of the input force to a higher force at the output member 30. The pump 36 draws hydraulic fluid from a reservoir 42. The pump 36 can be coupled with and drivable by the engine 44 that supplies drive torque to driven vehicle wheels 18. A return line 48 couples an outlet 50 of the booster 24 to the reservoir 42. As shown, the pump 36 can be a power steering pump that also provides fluid to a steering gear (e.g., steering gear box or steering rack) 54 to reduce required steering effort at a steering wheel 14 of the vehicle 10. A connection line 56 couples a second outlet 58 of the booster 24 with an inlet 60 of the steering gear 54. An outlet 62 of the steering gear 54 is coupled with the reservoir 42 by a return line 64.

The directional arrows of FIG. 1 show the hydraulic fluid flow. The engine 44 runs, turning the power steering pump 36, which in turn supplies a pressure/flow source to the hydraulic brake booster 24. The booster 24 directs some flow from the pump 36 into the booster 24 for internal actuation usage and also redirects hydraulic fluid to the steering gear 54 to assist actuation of steering maneuvers. Hydraulic fluid flows back to the reservoir 42 from both the brake booster 24 and the power steering gear 54 via the respective return lines 48, 64.

The booster system 20 of FIG. 1 is not conducive to application in a vehicle 10 equipped with engine stop-start management in which the engine is stopped automatically (i.e., by a controller without direct driver input) during vehicle operation, for example when the vehicle 10 comes to a stop. With the engine 44 off, the engine-driven hydraulic pressure source (i.e., the pump 36) that supplies pressurized hydraulic oil to power the hydraulic brake booster 24 and the steering gear 54 shuts down. When the engine 44 is shut down temporarily, the fluid in the booster 24 of FIG. 1 flows out (e.g., from a spool valve used within the brake booster 24). In such a scenario, a parking gear or parking brake must be engaged or the loss of boost power to the brakes would significantly increase required driver effort in order to hold a vehicle with a large Gross Vehicle Weight (e.g., GVW from 12,000 lbs. to 20,000 lbs.) on a surface that is not level.

Figure 2:
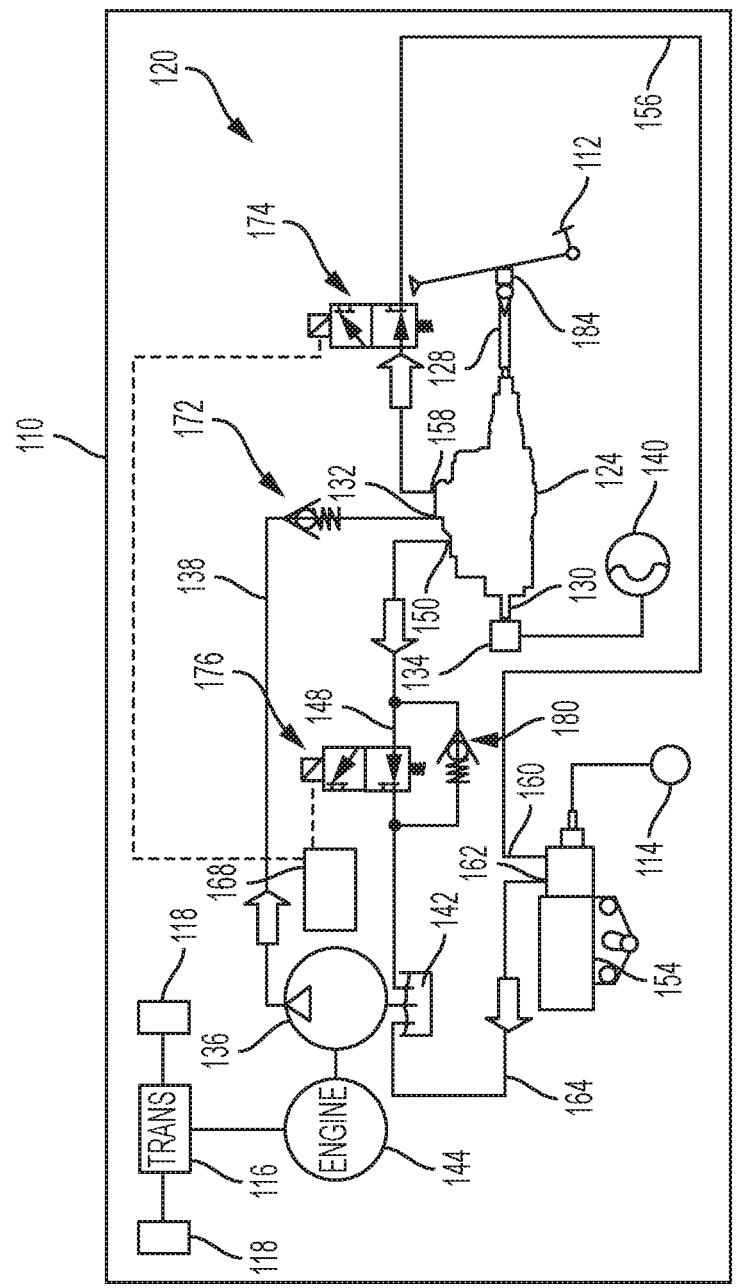
FIG. 2 schematically illustrates a vehicle including a lockable hydraulic vehicle brake booster system according to one aspect of the invention.

FIG. 2 illustrates a vehicle 110 including an engine 144 (e.g., internal combustion engine) for powering the drive wheels 118 via a transmission 116 to move the vehicle 110 along the ground. To prevent loss of the hydraulic boost force during engine stop-start, the hydraulic vehicle brake booster system 120 of FIG. 2 is equipped to trap pressure inside the booster 124. As described in further detail below, a combination of valves closes off the possible flow paths and holds the brake booster 124 in a locked, boost-applied state without activation of the pump 136.

As with the booster system 20 of FIG. 1, the booster 124 has an input member 128 configured to receive a braking input force (e.g., from a brake pedal 112) for boosting by the booster 124. The input force and the additional boost force are conveyed to an output member 130 which may be coupled to the input of a master cylinder 134 for actuating one or more hydraulic brake devices 140 of the vehicle 110. The hydraulic brake device 140 is associated with one of the vehicle wheels 118 to provide vehicle braking. The booster 124 includes an inlet 132 to receive a flow of pressurized hydraulic fluid from the pump 136 via a supply line 138 in order to provide boosting of the input force to a higher force at the output member 130. The pump 136 draws hydraulic fluid from a reservoir 142. The pump 136 can be coupled with and drivable by the engine 144 of the vehicle 110 that supplies drive torque to driven vehicle wheels 118. A return line 148 couples an outlet 150 of the booster 124 to the reservoir 142. As shown, the pump 136 can be a power steering pump that also provides fluid to a steering gear (e.g., steering gear box or steering rack) 154 to reduce required steering effort to a steering wheel 114 of the vehicle 110. A connection line 156 couples a second outlet 158 of the booster 124 with an inlet 160 of the steering gear 154. An outlet 162 of the steering gear 154 is coupled with the reservoir 142 by a return line 164. Each of the lines 138, 156, 148, 164 may be made of a flexible (deformable) tubing or a rigid (non-deformable) tubing.

In addition to the basic components that are similar to FIG. 1 and have similar operation, the booster system 120 of FIG. 2 includes a first valve, a one-way check valve 172, between the pump 136 and the booster 124 (e.g., in the supply line 138) that allows flow from the pump 136 to pass into the hydraulic booster 124, but does not allow flow from the booster 124 back to the pump 136 under engine-off conditions. Though shown schematically in the supply line 138, the one-way check valve 172 may be formed integrally with the pump 136, the brake booster 124, or anywhere therebetween to provide valving between the outlet of the pump 136 and a boost element of the brake booster 124.

Additionally, a second valve, an electrically-controlled solenoid valve 174 (e.g., normally-open), is provided along the connection line 156 between the booster 124 and the steering gear 154. Though shown schematically in the connection line 156, the solenoid valve 174 may be formed integrally with the brake booster 124, the steering gear 154, or anywhere therebetween to provide valving between the boost element of the brake booster 124 and a hydraulic element (e.g., piston) of the steering gear 154. Additionally, a third valve, an electrically-controlled solenoid valve 176 (e.g., normally-open), is provided along the return line 148 between the booster 124 and the reservoir 142. Though shown schematically in the return line 148, the solenoid valve 176 may be formed integrally with the brake booster 124, the reservoir 142, or anywhere therebetween to provide valving between the boost element of the brake booster 124 and an inlet of the reservoir 142.

The second and third valves 174, 176 are operable to receive respective electrical control signals from a controller 168. The controller 168 is programmed to assess the current state of the engine 144 and provide respective control signals to the solenoid valves 174, 176 in response. The current state of the engine 144 may be measured or calculated based on sensor outputs. For example, a wheel speed sensor, or an engine speed (e.g., crankshaft speed) sensor may indicate movement (or lack thereof) of the wheel or crankshaft. Alternatively, or in addition, the sensor may be the engine control unit (ECU) of the vehicle 110, which analyzes the output of a number of sensors to otherwise control vehicle functions such as fuel injection. The controller 168 may additionally be the engine management system that directs the engine stop-start function according to a preprogrammed routine.

The second and third valves 174, 176 are activated (e.g., having the respective solenoids electrically excited) to close when the engine 144 is triggered to shut off by the engine management system. This traps pressure in the booster 124 so that a boost effect is maintained to assist in applying hydraulic force to the brake devices 140. A check valve 180 can be provided in parallel with the third valve 176 to be used as a down regulator to give a maximum pressure that the hydraulic booster 124 is able to contain under the trapped pressure mode. A pedal rod switch 184 (e.g., brake light switch such as a zero adjust brake switch, brake pedal position sensor) is incorporated to allow hydraulic fluid trapped in the booster 124 to escape if the brake pedal 112 is released by the driver during the engine-off phase of a stop-start cycle.

Utilizing flexible tubing (i.e., for lines 138, 156, 148) between the closed valves 172, 174, 176 and the booster 124 may lead to swelling of the hoses, thereby increasing the volume of the system (i.e., decreasing the pressure of the trapped fluid) and modifying the reaction force at the pedal 112. While this may be desirable in some embodiments, In other embodiments, the first valve 172, the second valve 174, and the third valve 176 may all be located at (e.g., integrally formed with, directly adjacent to) the booster 124. Alternatively, the valves 172, 174, 176 may communicate with the booster via rigid tubing. In such embodiments, where no flexible tubing is located between each valve 172, 174, 176 and the respective inlet/outlet 132, 158, 150 of the booster 124, the pressure trapped within the booster cannot decrease based on a system volume increase. This may provide a more consistent pedal response.

Figure 3:
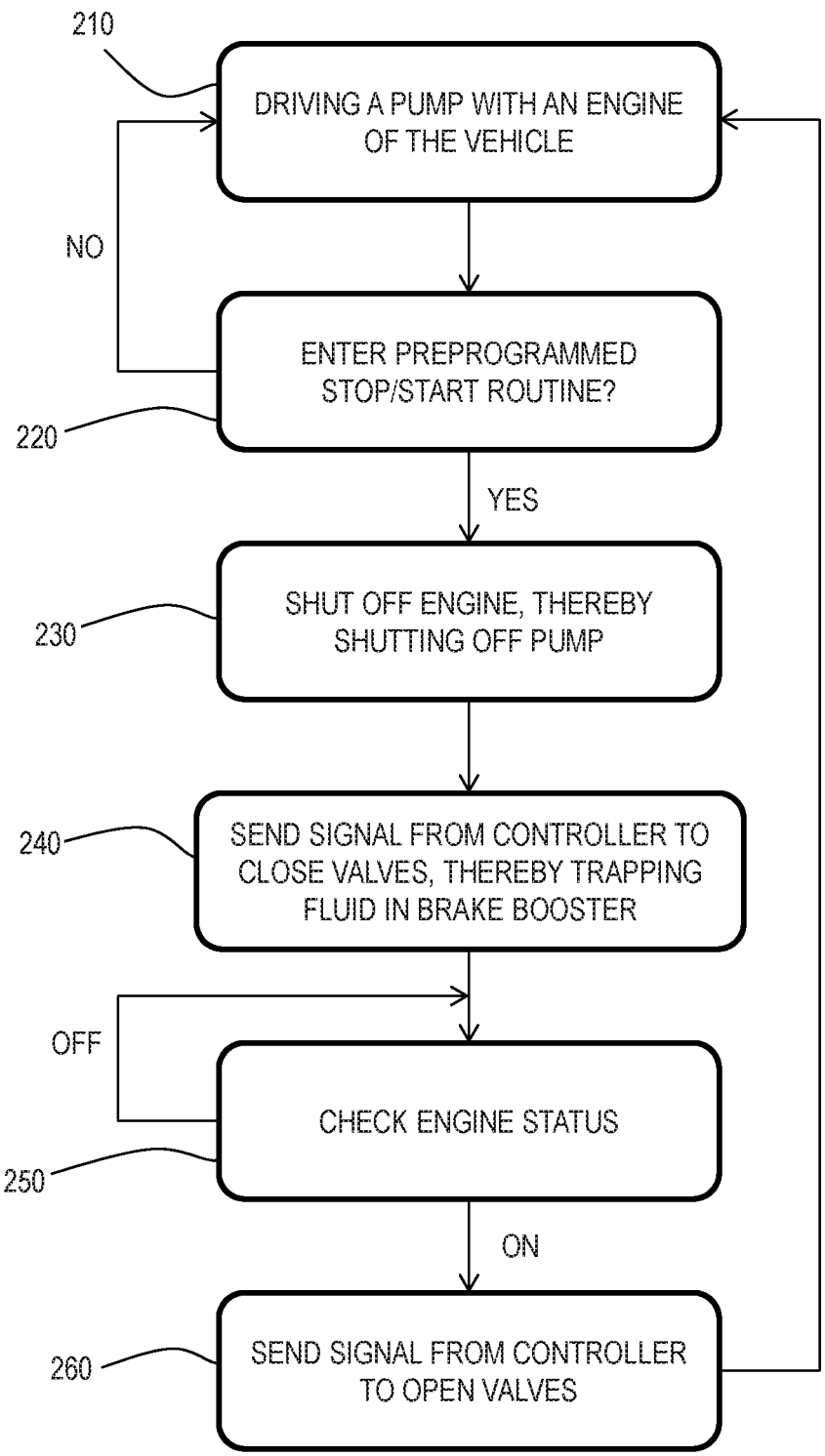
FIG. 3 is a flow diagram illustrating a method of locking fluid within the hydraulic vehicle brake booster system of FIG. 2.

As described in the flowchart of FIG. 3, at step 210, the pump 136 is driven by the engine 144 until the engine management system initiates an automatic stop/start routine (step 220). In the stop/start routine, the engine 144 is shut off, thereby shutting off the pump 136 (step 230). At the same time or immediately after, the controller 168 sends a signal to close the valves 174, 176, thereby trapping the hydraulic fluid within the brake booster 124 (step 240). The valves 174, 176 remain closed until the engine 144 restarts, thereby maintaining boost pressure within the booster 124 when the pump 136 is non-operational. At step 250, when the engine 144 restarts, the pump 136 restarts, and the controller 168 sends a signal to re-open the valves 174, 176, allowing the hydraulic cycle between the pump 136, the brake booster 124, and the reservoir 142 to recommence (step 260). As such, required driver input force to the brake pedal 112 does not dramatically increase when the vehicle 110 is stopped on an incline and the engine 144 automatically turns off.

From the perspective of the vehicle user or operator, the user applies force to the brake pedal 112, moving the brake pedal 112, thereby closing the pedal rod switch 184 and continuing to apply the braking force to the wheel cylinders 140. With the pedal 112 depressed by the operator, the brake booster 124 is locked as described in the flowchart of FIG. 3. When the operator releases the brake pedal 112, the pedal rod switch 184 opens and the engine 144 is started, although the brake pedal 112 may remain in an at least partially depressed position. Opening the switch 184 may trigger a controller signal to restart the engine 144. The brake pedal 112 remains at least partially depressed for a short duration (e.g., a fraction of a second) until the brake booster 124 is unlocked. With the engine 144 running, the pump 136 is once again operable to provide hydraulic fluid to the brake booster 124 for normal hydraulically-boosted braking. Therefore, the controller 168 sends a signal to the valves 174, 176 to unlock the brake booster 124, thereby releasing the brake pedal 112.

What is claimed is:

1. A vehicle brake booster system comprising:
   a reservoir;
   a pump operable to drive a hydraulic fluid from the reservoir;
   a brake booster including an input member adapted to receive a manual braking input force from a vehicle operator and an output member adapted to apply a braking output force to a master cylinder;
   a supply line coupling an outlet of the pump to an inlet of the brake booster;
   a return line coupling an outlet of the brake booster to the reservoir, and
   a steering gear in communication with the brake booster via a connection line and with the reservoir via a steering gear return line,
   wherein a flow of hydraulic fluid pumped to the brake booster by the pump provides a boost factor by which the braking output force exceeds the braking input force;
   wherein the brake booster is hydraulically lockable by a first valve in the supply line and a second valve in the return line such that when the first and second valves are closed, a quantity of hydraulic fluid is trapped within the brake booster to maintain operation of the brake booster without continued operation of the pump, and
   wherein a third valve in the connection line is operable to lock the quantity of hydraulic fluid within the brake booster when the pump is non-operational.

2. The vehicle brake booster system of claim 1, wherein the first valve is a one-way check valve operable to prevent fluid from draining from the brake booster, through the supply line, and to the pump.

3. The vehicle brake booster system of claim 1, wherein the second valve is a solenoid valve operable to prevent fluid from draining from the brake booster, through the return line, and to the reservoir.

4. The vehicle brake booster system of claim 3, wherein the solenoid valve is biased to an open position and is electrically actuatable to a closed position.

5. The vehicle brake booster system of claim 1, wherein the third valve is a solenoid valve operable to prevent fluid from draining from the brake booster, through the connection line, and to the steering gear.

6. The vehicle brake booster system of claim 1, wherein the solenoid valve is biased to an open position and is electrically actuatable to a closed position.

7. The vehicle brake booster system of claim 1, further comprising a controller electrically coupled to the second valve and programmed to actuate the second valve closed when the pump is not driving the hydraulic fluid from the reservoir.

8. A vehicle comprising:
   a plurality of drive wheels;
   an engine for powering the drive wheels to move the vehicle along the ground;
   a brake booster system including:
      a reservoir;
      a pump operable to drive a hydraulic fluid from the reservoir;
      a brake booster;
      a supply line coupling an outlet of the pump to an inlet of the brake booster; and
      a return line coupling an outlet of the brake booster to the reservoir; and
   a steering gear operable to reduce a required steering effort of the vehicle, the steering gear in communication with the brake booster via a connection line and with the reservoir via a steering gear return line,
   wherein the brake booster includes an input member adapted to receive a manual braking input force from a vehicle operator and an output member adapted to apply a braking output force to a master cylinder,
   wherein a flow of hydraulic fluid pumped to the brake booster by the pump provides a boost factor by which the braking output force exceeds the braking input force, and
   wherein the brake booster is hydraulically lockable by a first valve in the supply line and a second valve in the return line such that when the first and second valves are closed, a quantity of hydraulic fluid is trapped within the brake booster to maintain operation of the brake booster without continued operation of the pump, and
   wherein a third valve in the connection line is operable to lock the quantity of hydraulic fluid within the brake booster when the pump is non-operational.

9. The vehicle of claim 8, wherein the pump is non-operational when the engine is turned off.

10. The vehicle of claim 9, wherein the second valve is a normally open solenoid valve operable to prevent fluid from draining from the brake booster, through the return line, and to the reservoir when the pump is non-operational.

11. The vehicle of claim 10, wherein the return line is provided with a check valve in parallel with the second valve, the check valve operable to allow hydraulic fluid above a threshold pressure value from the brake booster to the reservoir regardless of the position of the second valve.

12. The vehicle of claim 8, further comprising a controller having a preprogrammed stop/start routine for automatically stopping and re-starting the engine without direct initiation by a human operator, and wherein the controller is programmed to actuate the second valve into a closed position to lock a quantity of hydraulic fluid within the brake booster in response to an automatic engine stoppage of the stop/start routine.

13. The vehicle of claim 12, wherein the controller is programmed to unlock the locked quantity of hydraulic fluid in response to subsequent automatic engine re-starting of the stop/start routine.

* * * * *